3,167,580
PROCESS FOR THE PREPARATION OF
IMINODIACETONITRILE
Kenneth Worden Saunders, Darien, William Herbert Montgomery, Springdale, and James Charles French, Stamford, Conn., assignors to American Cyanamid Company, Stamford, Conn., a corporation of Maine
No Drawing. Filed Apr. 12, 1962, Ser. No. 186,859
3 Claims. (Cl. 260—465.5)

This invention relates to the synthesis of nitriles. More particularly, it relates to a novel process for preparing iminodiacetonitrile.

Iminodiacetonitrile has previously been prepared by several different routes. A classical procedure for its preparation is the ammonolysis of glycolonitrile as described by Eschweiler, Ann., 278, 238 (1894). This particular process has been unsatisfactory because of poor yields obtained and because of the time required for completion of the reaction.

A better method has been described by Thompson in U.S. Patent No. 2,511,487. This particular procedure for producing iminodiacetonitrile involves heating aminoacetonitrile with glycolonitrile in the absence of an alkaline catalyst. This process, however, suffers from the disadvantage that both reactants must first be prepared by means of separate syntheses.

Similarly, the preparation of an intermediate is necessary in the process of Mostek in U.S. Patent No. 2,442,547 which outlines a process for producing iminodiacetonitrile from chloroacetonitrile and gaseous ammonia.

The necessity for resorting to an intermediate is also found in the process described by Bailey in J. Am. Chem. Soc., 39, 938 (1915) which outlines the preparation of iminodiacetonitrile by the reaction of N-methylene glycinonitrile and hydrogen cyanide.

Perhaps the most direct synthesis for making iminodiacetonitrile is that disclosed in the recently issued U.S. Patent No. 2,794,044 to Miller. The process therein sets forth the reaction of ammonia, formaldehyde and hydrogen cyanide in a slightly acidified aqueous solution. This process, however, is essentially a batch process, the time for which may range from ten to twenty-four hours. As a result, it does not readily lend itself to large scale commercial operation. Furthermore, the yield of iminodiacetonitrile based upon the amount of formaldehyde employed is not considered to be at an optimum level.

It has now been discovered that iminodiacetonitrile may be prepared in a direct one-step synthesis from cheap, widely available starting materials which synthesis not only avoids the use of intermediates found necessary for certain prior art processes but also eliminates a costly batch-wise procedure requiring an excessive amount of time for completion of the reaction.

In accordance with the present invention, it has been found that iminodiacetonitrile may be obtained from hydrogen cyanide, formaldehyde and ammonia by critically controlling the mixing of the reactants, the mol ratio of each of the reactants, the temperature and pH of the reaction and the residence time of the reactants within a reaction chamber. Essentially, our invention may be said to be based upon the principle that hydrogen cyanide, formaldehyde and ammonia may be reacted in a continuous process to obtain iminodiacetonitrile under certain critically controlled conditions. While continuity of operation in any chemical process is always an objective, it is an achievement which is not easily realizable. It is primarily for this reason that the process of the present invention constitutes such a radical departure from the prior art procedures for the preparation of iminodiacetonitrile.

According to the present invention, the mol ratio of formaldehyde to hydrogen cyanide and the mol ratio of ammonia to hydrogen cyanide, the temperature and pH of the reaction mixture are maintained at critical levels and the feed of all three reactants to a reactor is critically controlled so as to obtain iminodiacetonitrile in a continuous manner in yields previously not considered possible. In carrying out this substantially continuous process, an acid-stabilized aqueous formaldehyde solution is first circulated through the reactor and the system is then brought to operating pressure. To this solution hydrogen cyanide is added and mixed therewith while the pH is maintained below about 4. Ammonia is then added to the formaldehyde-hydrogen cyanide solution and the system is brought to operating temperature. When equilibrium conditions are obtained, which is rapid because of the exothermic nature of the reaction, the feed of all three reactants to the reactor is continued at approximately the same rate, i.e., the mol ratio of the reactants is unchanged. The pH of the solution of reactants within the reactor is maintained at least above 7. During the feed of the reactants to the reactor, product solution is withdrawn continuously from the reactor at a rate so as to permit optimum and critical residence time of the reactants within the reactor. The product, iminodiacetonitrile, is separated by cooling of the withdrawn product solution. Thus, it has been found that conversions of formaldehyde to iminodiacetonitrile as high as 90% and of hydrogen cyanide to iminodiacetonitrile as high as 75% are readily realizable.

In the process of this invention, the mol ratio of formaldehyde to hydrogen cyanide is maintained at approximately 0.6 to 1.0 while the mol ratio of ammonia to hydrogen cyanide is maintained at approximately 2.2 to 4.0.

The temperature of the reaction mixture is maintained within the range of from about 35 to 60° C. while the pH of the reaction mixture is kept on the alkaline side, i.e., from about seven to about nine. It has been found that residence times of the reactants within the reactor of less than about ten minutes are advantageously employed with times of two to six minutes preferred.

The reaction which takes place in the practice of the process of the present invention may be illustrated by the following equation:

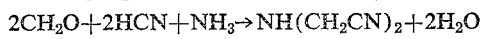
$2CH_2O + 2HCN + NH_3 \rightarrow NH(CH_2CN)_2 + 2H_2O$

While the overall process is not limited to the use of a particular type of reaction chamber in which the direct one-step continuous synthesis of iminodiacetonitrile is carried out, it is advantageous to describe the equipment of the type which may be used.

The reaction of formaldehyde, hydrogen cyanide and ammonia was carried out in a three-stage continuous tubular reactor designed for a fast exothermic reaction. Each reactor stage consisted of a hair-pin loop of ¼" stainless steel. Thermocouples were placed at the entrance and in the middle of the reactor. The reactor was surrounded by a jacket to which water from a steam-water mixer was fed continuously countercurrently. The volume of the first, second and third stages was 238, 119.5 and 119.5 milliliters, respectively. The valving on this equipment was such that nine different flow patterns were permissible. Although this set up was called a three-stage reactor and could be used as such, the kinetics of the reaction were studied in a single stage reactor wherein the flow was circulated through the reactor while the volume was 238 milliliters. Alternatively, however, the flow could be circulated through the first and second loops where the volume was 477 milliliters. The design of the reactors limited temperatures to 110° C. and pressures to 150 pounds per square inch.

The reactants were pumped and mixed just prior to entry into the first loop of the continuous single-step reactor.

The formaldehyde was fed as an acid-stabilized aqueous solution. Liquid hydrogen cyanide was pumped against a discharge pressure of 175 p.s.i. and the discharge system contained appropriate relief valves to reduce the possibility of back up of the reactor product into the hydrogen cyanide feed system. Anhydrous ammonia was fed as a liquid from an ammonia storage tank pressurized with nitrogen at 200 p.s.i.

Hydrogen cyanide and acid stabilized formaldehyde were first mixed in a T and immediately following this was a thermocouple inserted to record any temperature rise. In the process of this invention, an exotherm upon mixing was not observed at this point thus indicating the absence of any reaction between hydrogen cyanide and formaldehyde on the acid side which reaction would have given rise to the possibility that glycolonitrile was produced in situ. Next in line was a pipe cross, two ports of which served as part of the reactor loop described previously. The formaldehyde-hydrogen cyanide feed entered the third port and ammonia entered the fourth port of the pipe cross.

The formaldehyde employed in the process is ordinarily in aqueous solution advantageously stabilized with methanol in an amount from about 8 to 12%. Commercially available solutions containing 30 to 40% formaldehyde are preferably employed. Solutions containing formaldehyde in higher concentrations may also be used with good success, however. Additionally, it is essential to employ formaldehyde which is acid stabilized. Acids suitable for stabilization include the mineral acids and, of these, phosphoric acid is preferred. In order to stabilize the formaldehyde-hydrogen cyanide stream at below about pH 4 until it is admixed with ammonia, the amount of acid generally ranges from about 0.05 to about 0.5%.

Iminodiacetonitrile is isolated by cooling the product solution. Thereupon the iminodiacetonitrile crystallized out and it was filtered off. Since it ordinarily contaned some impurities, it may be recrystallized from any of various suitable solvents including lower alcohols such as methanol, ethanol and the like or aromatic hydrocarbons such as benzene, toluene and the like. A sample of iminodiacetonitrile obtained according to the process of this invention when recrystallized from benzene melted at 74° to 78° C. (Literature 75° to 77° C.)

In order to illustrate the manner in which the present invention may be carried out, the following table summarizes the results of various runs, which are not to be considered as limitative examples.

Table

| Run | T., °C | Residence Time (min.) | $CH_2O$ in Feed (mol/l.) | Mol Ratios | | Conversions (percent) | | | | | |
| --- | --- | --- | --- | --- | --- | --- | --- | --- | --- | --- | --- |
| | | | | $\frac{CH_2O}{HCN}$ | $\frac{NH_3}{HCN}$ | $CH_2O$ to— | | | HCN to— | | |
| | | | | | | IN[1] | GN[2] | MGN[3] | IN | GN | MGN |
| 1A | 40 | 2.4 | 1.78 | 1.0 | 4.1 | 75 | 19.6 | 0 | 75 | 19.5 | 0 |
| 1B | 40 | 3.6 | 1.78 | 1.0 | 4.1 | 70 | 24.5 | 0 | 70 | 24.3 | 0 |
| 1C | 40 | 4.8 | 1.78 | 1.0 | 4.1 | 69 | 25.1 | 0 | 69 | 14.0 | 0 |
| 5B | 57 | 3.6 | 1.95 | 0.6 | 2.4 | 56 | 8.4 | 0 | 87–93 | 15.0 | 0 |
| 7B | 40 | 3.6 | 3.32 | 1.1 | 2.2 | 75 | 16.1 | 3.4 | 70 | 15.9 | 6.4 |
| 11B | 57 | 3.6 | 3.58 | 0.65 | 2.4 | 55 | 10.3 | 0 | 85 | | 0 |

[1] Iminodiacetonitrile.
[2] Glycinonitrile.
[3] N-methylene glycinonitrile.

From the above data, it will be seen that optimum conversion to iminodiacetonitrile based upon both formaldehyde and hydrogen cyanide appears to be obtained when the mol ratio of formaldehyde to hydrogen cyanide is about 1.0 or less, the mol ratio of ammonia to hydrogen cyanide is greater than 2.2 and the temperature is 40 to 60° C. At less than optimum conditions, an increasing amount of glycinonitrile is produced. It will also be noted that a small amount of N-methylene glycinonitrile may sometimes be obtained.

While the process of the present invention is well adapted to operation in a continuous manner employing a tubular converter under conditions of either viscous or turbulent flow, the reaction may also be conducted in a stirred autoclave or other similar type apparatus.

While the present invention has been described in conjunction with various preferred embodiments, it is to be understood that the invention is not to be limited to such exemplary description and is to be construed broadly and limited only by the following claims.

We claim:

1. A continuous process for preparing iminodiacetonitrile which comprises bringing into reactive contact for a period of less than about ten minutes acid stabilized formaldehyde, hydrogen cyanide and ammonia, maintaining during said contact period (a) the mol ratio of $CH_2O/HCN$ at between about 0.6/1 and about 1/1;

(b) the mol ratio of $NH_3/HCN$ at between about 2.2/1 and about 4/1;

(c) the temperature at between about 35° and about 60° C.;

(d) the pH at greater than 7;

continuously withdrawing product solution at a rate effective to maintain said contact period, and isolating iminodiacetonitrile from said product solution.

2. A process as in claim 1 in which reactive contact is established by adding ammonia to an aqueous solution of acid stabilized formaldehyde and hydrogen cyanide.

3. A process as in claim 2 in which said aqueous solution of formaldehyde and hydrogen cyanide prior to the addition of ammonia thereto is maintained at a pH of less than about 4.

References Cited by the Examiner

UNITED STATES PATENTS

| 2,405,966 | 8/46 | Loder | 260—465.5 |
| 2,511,487 | 6/50 | Thompson | 260—465.5 |
| 2,794,044 | 5/57 | Miller | 260—465.5 |

CHARLES B. PARKER, *Primary Examiner.*

LEON ZITVER, *Examiner.*